United States Patent [19]
McClasky

[11] Patent Number: 6,009,837
[45] Date of Patent: Jan. 4, 2000

[54] PURPLE MARTIN BIRDHOUSE AND TELESCOPING POLE

[76] Inventor: David R. McClasky, 36 Dauphine Dr., Lake St. Louis, Mo. 63367

[21] Appl. No.: 09/047,881

[22] Filed: Mar. 25, 1998

[51] Int. Cl.[7] .................................................. A01K 31/00
[52] U.S. Cl. .............................................................. 119/428
[58] Field of Search ................................. 119/428, 429, 119/432, 51.01, 52.2, 52.3, 57.8, 57.9

[56] References Cited

U.S. PATENT DOCUMENTS

| | | | |
|---|---|---|---|
| D. 163,666 | 6/1951 | Worden | D30/110 |
| D. 164,707 | 10/1951 | Nissen | D30/110 |
| D. 170,833 | 11/1953 | Rebora | D30/110 |
| D. 221,090 | 7/1971 | Vail | D30/111 |
| D. 233,994 | 12/1974 | Bishop, Sr. | D30/110 |
| D. 245,927 | 9/1977 | Edwards et al. | D30/3 |
| D. 281,917 | 12/1985 | Myers et al. | D30/3 |
| 1,169,409 | 1/1916 | Larson | 119/23 |
| 1,516,381 | 11/1924 | Erickson | D30/111 |
| 2,236,593 | 4/1941 | Booth | D30/110 |
| 2,951,312 | 9/1960 | Engh | D30/111 |
| 3,111,934 | 11/1963 | Vail | 119/428 |
| 3,367,632 | 2/1968 | Vail | 119/428 |
| 3,418,976 | 12/1968 | Vail | 119/428 |
| 3,426,732 | 2/1969 | Wade | 119/428 |
| 3,563,205 | 2/1971 | Vail | 119/428 |
| 3,696,792 | 10/1972 | Bruhns | 119/428 |
| 3,792,685 | 2/1974 | Wiener | 119/428 |
| 5,540,017 | 7/1996 | Eilam et al. | 52/118 |

FOREIGN PATENT DOCUMENTS

| | | | |
|---|---|---|---|
| 2323506 | 11/1974 | Germany | 119/428 |

Primary Examiner—Thomas Price
Attorney, Agent, or Firm—Gary J. Fishel

[57] ABSTRACT

A purple martin birdhouse mounted on a receiver that is adapted to be attached to a non-rotatable telescoping pole, the receiver and the sections of the telescoping pole having a bore of cross section the shape of a convex polygon. The shape of the receiver and the telescoping pole prevent relative rotation when the birdhouse is mounted on the pole and lowered for a nest check. A resiliently biased pin connects the receiver to the pole in only one orientation, preventing incorrect polarization of the house when it is reinstalled on the pole at the beginning of a season.

9 Claims, 8 Drawing Sheets

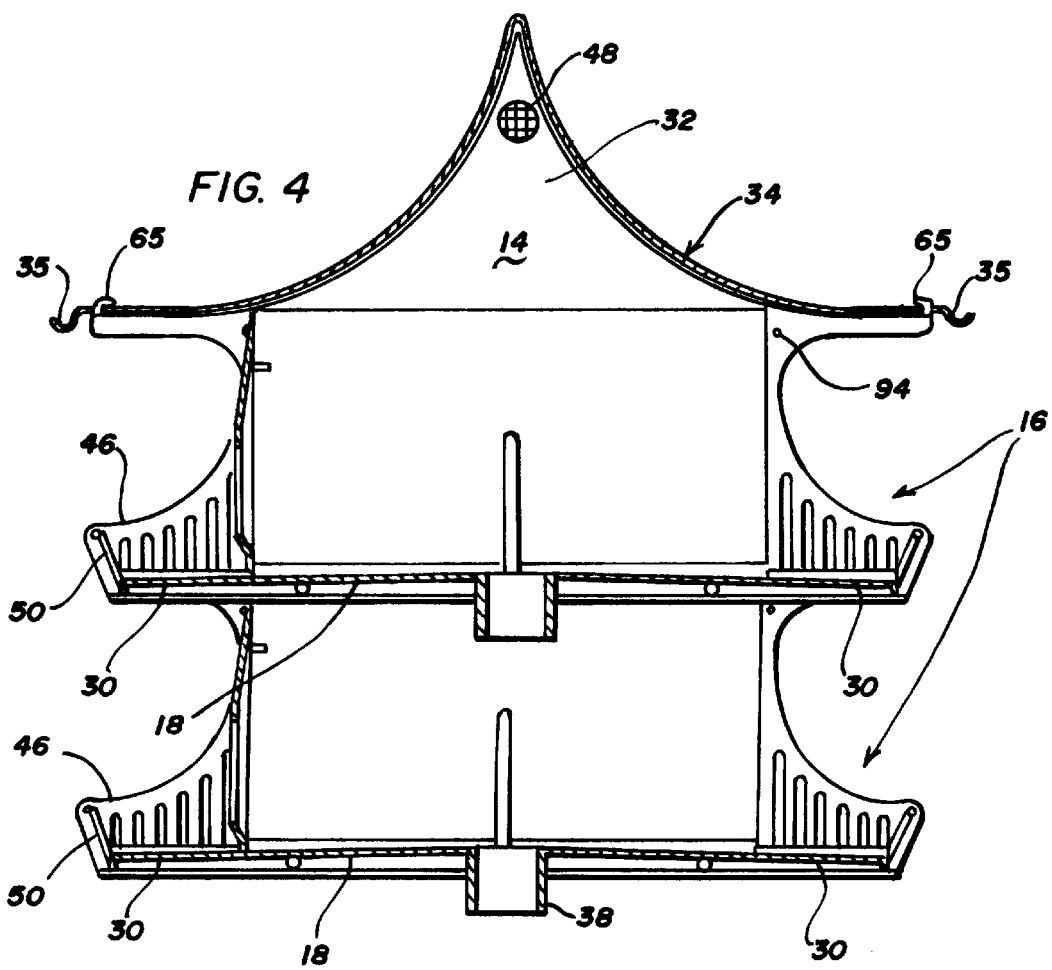
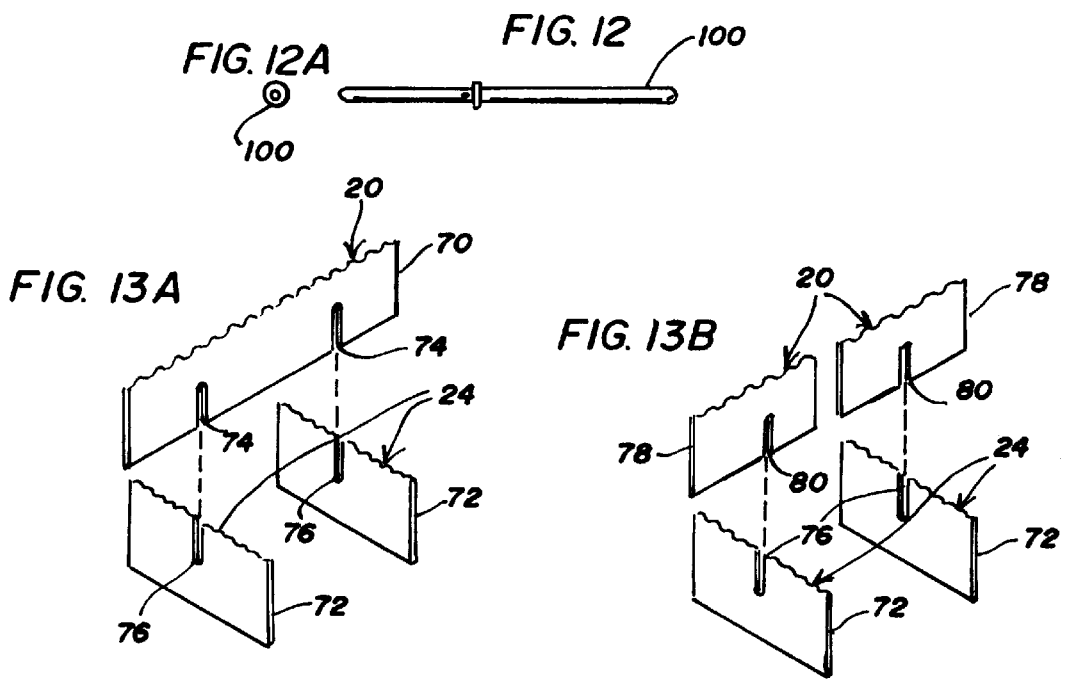

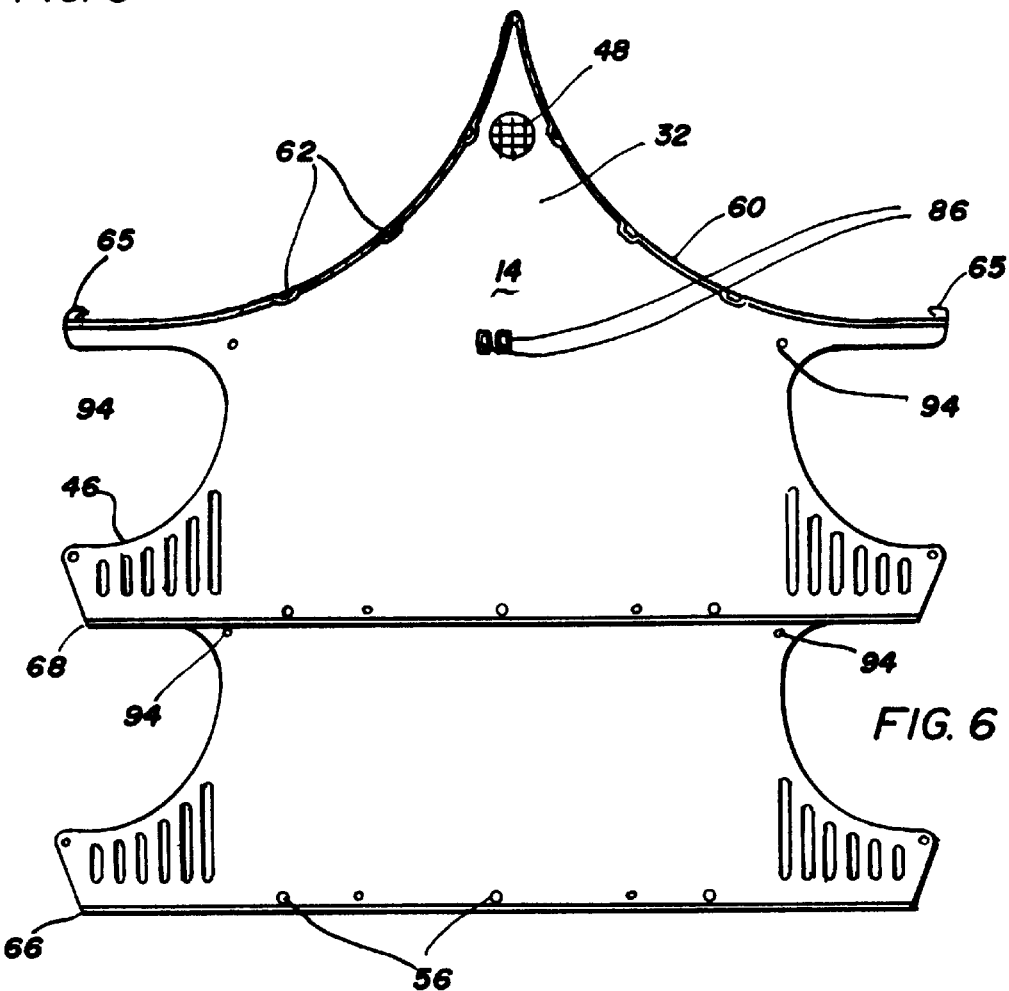

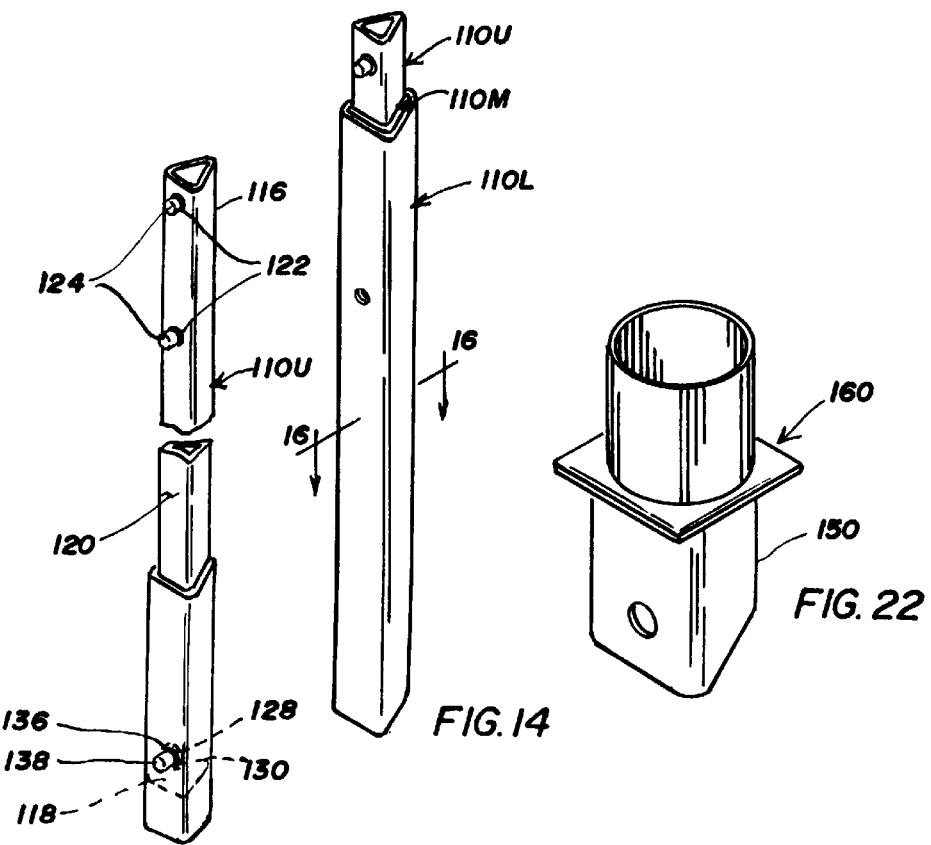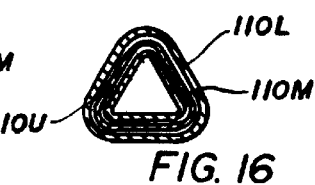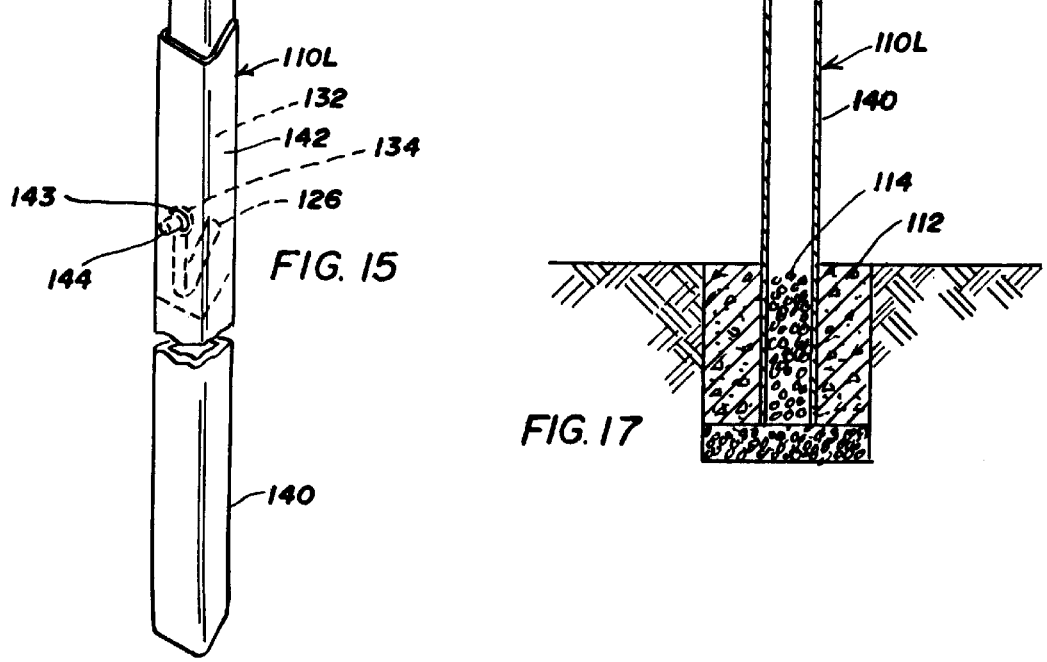

PURPLE MARTIN BIRDHOUSE AND TELESCOPING POLE

BACKGROUND OF THE INVENTION

1. Field of the Invention

The present invention relates to a purple martin birdhouse which provides correct polarization of the birdhouse on a non-rotatable telescoping pole. The birdhouse is mounted to the pole by a receiver and the pole is formed from a plurality of sections, the receiver and the sections of the pole having a bore of cross section the shape of a convex polygon.

2. Brief Description of the Prior Art

Purple martins have become dependent on humans for supplying them with nesting sites. It is a mutually beneficial relationship as a single purple martin can eat up to 2,000 mosquitoes and other insects a day. Purple martins are aerial insectivores, meaning that they catch all of their food in flight. In addition to being efficient and effective destroyers of insects, there are other good reasons for humans to cultivate the relationship. Purple martins are beautiful, graceful birds to watch. They begin singing early in the morning and are entertaining to watch. The birds are like calendars, marking the seasons, since every phase of their annual cycle (from arrival, territory establishment, nest-building, egg-laying, hatching, fledgling and departure) is done on a regular and predictable schedule.

Purple martins are a gregarious species and prefer to nest in multi-compartmentalized birdhouses. A purple martin birdhouse must be managed to reduce parasite infections and guarded against European starlings and English house sparrows which will otherwise out-compete the martins for the nesting compartments. An unmanaged purple martin colony is one that is at high risk of being lost from one year to the next.

To facilitate the effective management of the colony, the birdhouse should be checked periodically and used martin nests and the nests of other species removed. Since a purple martin birdhouse is optimally placed at a height of 12–15 feet, the birdhouse should be on a telescoping pole that allows the house to be lowered vertically without disturbing any eggs. Lowering the house will not disturb the martins while they are nesting. They will fly away initially, but they will quickly return once the house is back up. Caution must be used, however, not to disturb the birdhouse if some of the babies are about to fledge as they may be scared into flying too soon.

When a birdhouse is lowered for a nest check, it is essential that it have the same polarization when it is returned since martins recognize their own nest compartment by its height, relative position and compass direction. If a birdhouse is repositioned in a different compass direction, havoc will break out. Purple martins will go into the compartment in the position that was their own and perhaps find nestlings, when all they had was eggs. In such case, they may throw the foreign young out. Others, while looking for their nests will trespass into the compartments of others, resulting in prolonged and potentially lethal battles. The end result can be reproductive failure, leading to colony-site abandonment.

A purple martin birdhouse should be taken down and cleaned out at the end of the season. If a person makes the mistake of leaving the martin house out, and open, over the winter and paper wasps, squirrels, American kestrels or screech owls take up residence before the martins return from migration, the martins will abandon the house. When the birdhouse is put back up, at the beginning of a season, it is important that it be reinstalled in the same compass direction as last year, otherwise there will be the same kind of strife between the returning pairs of birds that occurs if the house is reoriented during a nest check.

There are telescoping poles for mounting a purple martin birdhouse, most, however, have sections that permit the rotation of the telescoping members or that permit the rotation of the house, either during a nest check or during reinstallation of the house at the beginning of the season. To avoid problems, a person must be careful to mark the sections and the house to be certain that the house maintains the correct polarization. People either forget to mark the sections and the house or forget, between uses, what the markings mean. There are non-rotating telescoping poles proposed for use with purple martin birdhouses that make use of elaborate and complicated mechanisms to prevent rotation of the sections or the house. Such means usually include elongate guide means on the sections and additional components with stationary guiding structure which do not form part of the telescoping members, e.g., U.S. Pat. No. 3,792,685 to Wiener. Such poles are costly to fabricate and are lacking in structural strength.

BRIEF SUMMARY OF THE INVENTION

In view of the above, it is an object of the present invention to provide a purple martin birdhouse that ensures consistent polarization of the birdhouse when it is taken down and reinstalled on a pole. It is another object to provide a non-rotatable telescoping pole that can be used to raise and lower a purple martin birdhouse without rotating the birdhouse. Other objects and features of the invention will be in part apparent and in part pointed out hereinafter.

In accordance with the present invention, a purple martin birdhouse has a receiver with a bore of cross-section the shape of a convex polygon, such as an equilateral triangle. The bore has a hole for receipt of a pin whereby the birdhouse can be mounted on a pole having an outer surface with a cross-section of shape corresponding to the cross-section of the receiver and a pin is biased for receipt in the hole of the receiver. Since the receiver has just one hole, the birdhouse can be attached to the pole in just one orientation and relative rotation of the receiver and the pole is prevented by engagement of the outer surface of the pole with the bore of the receiver.

In a second aspect, the birdhouse has a pair of spaced parallel sidewall panels and an upper and a lower tier, with the tiers stacked. Each tier has a floor attached to the sidewall panels and partitions for dividing the tier into a plurality of compartments in two rows of compartments arranged back to back. Cleanout doors are pivotally attached to the sidewall panels and have openings to provide separate access to the interior of the individual compartments in each row of compartments. Each of sidewalls has an upper edge upon which is mounted a roof. The floor extends beyond each row of compartments to provide a balcony and the floor is peaked between the sidewalls and sloped towards the balcony. Water on the balcony drains away from the compartments and any water forced into the compartments tends to seep out, keeping the compartments dry.

A third facet of the invention concerns a non-rotatable telescoping pole to which the birdhouse with the receiver can be mounted with consistent polarization of the birdhouse. The pole has an inner tubular section with first and second ends and an outer surface with a cross-section of shape corresponding to the cross-section of the receiver. An outer tubular section, with first and second end, has a bore corresponding to the cross-section of the outer surface of the inner section, the bore of the outer section being in friction contact with the outer surface of the inner tubular section and the inner tubular section axially slidable within the bore of the outer section.

The outer tubular section also has a hole proximate its second end and the inner tubular section has a hole proximate its first end and a hole proximate its second end. The inner tubular section has a pin aligned with each of said holes and a biasing element that biases the pin outwardly through the hole. The pin at the first end of the inner section is aligned with the hole in the outer section when the inner section is extended from the outer section. The pin is biased outwardly in the hole in the outer section, thus impeding further relative axial movement of the inner and outer sections. Relative rotation of the inner and outer sections is prevented by engagement of the outer surface of the inner tubular section with the bore of the outer section.

The pin at the second end of the inner section is aligned with the hole in the receiver of the birdhouse, when the birdhouse is mounted on the pole. The pin is biased outwardly into the hole, thus attaching the birdhouse to the pole in only one orientation, relative rotation of the receiver and the inner section being prevented by engagement of the outer surface of the inner tubular section with the bore of the receiver.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 4 is a side elevation of the birdhouse in section taken along line 4—4 in FIG. 1;

FIG. 5 is a plan view of the cleanout door in section taken along line 5—5 in FIG. 3;

FIG. 6 is a side elevation of a sidewall panel taken along line 6—6 in FIG. 1;

FIG. 11 is a detailed perspective view, on an enlarged scale, showing one way to hinge the cleanout door to the sidewall panel;

FIG. 12 is a side view of a perch for attachment to the sidewall panel;

FIG. 12A is an end view of the perch;

FIG. 13A is a perspective view, on a reduced scale, of the partitions for the upper tier;

FIG. 13B is a perspective view, on a reduced scale, of the partitions for the lower tier;

FIG. 14 is a perspective view of a non-rotating telescoping pole in accordance with the present invention, shown in retracted condition;

FIG. 15 is a perspective view of the pole in extended condition;

FIG. 16 is a cross section taken along line 16—16 in FIG. 14 showing the three concentric sections making up the pole;

FIG. 17 is a side elevation in cross section showing the lower section of the pole set in cement and partially filled with pea gravel;

FIG. 21 is a perspective view of an adapter for mounting a flag on the pole shown in FIGS. 14–15; and, FIG. 22 is an adapter for use with the poles shown in FIGS. 14–15 for mounting a birdhouse having a circular receiver or the like.

DETAILED DESCRIPTION OF THE INVENTION

Figure 1:
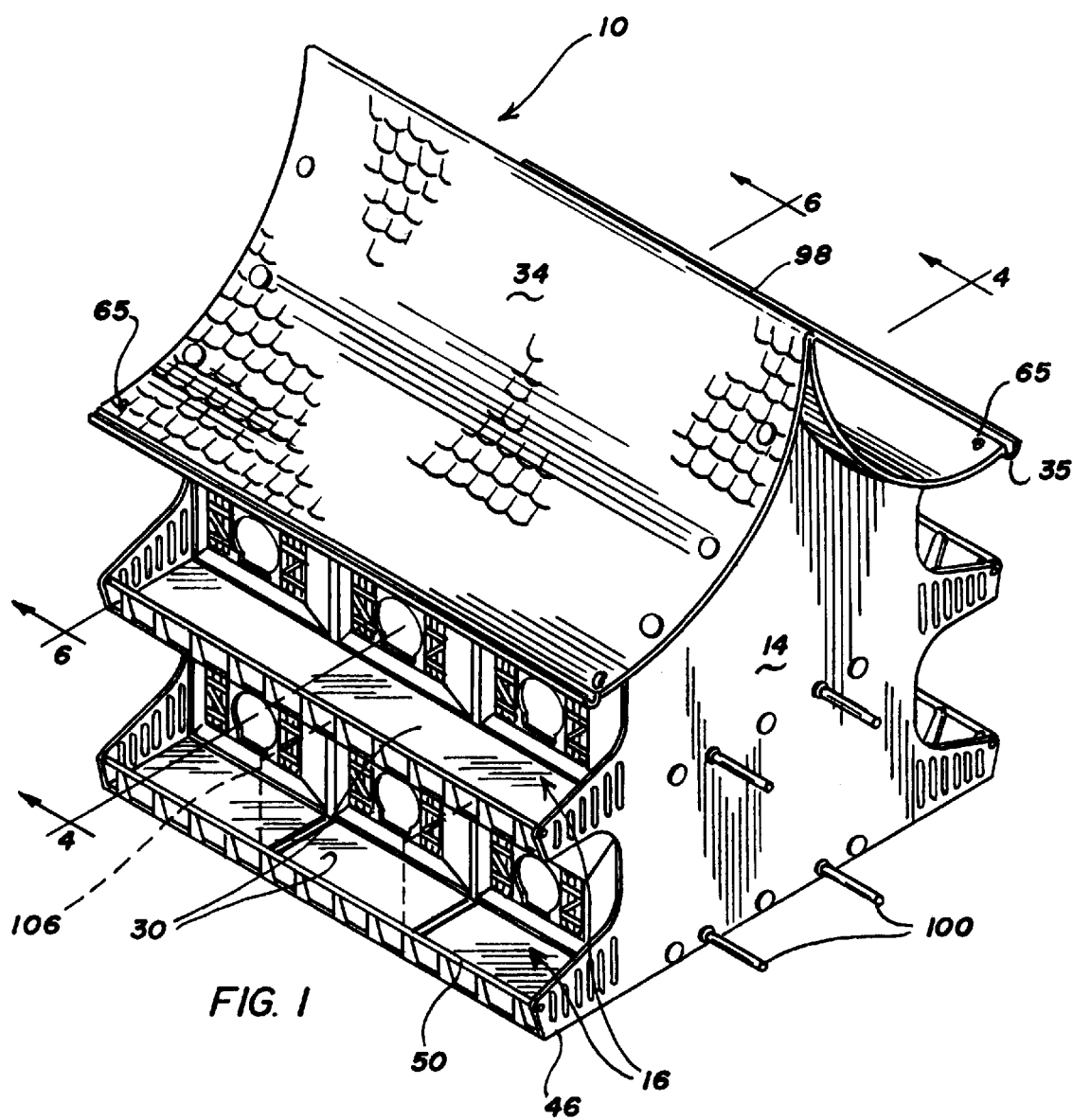
FIG. 1 is a perspective view of a purple martin birdhouse in accordance with the present invention.

Referring to the drawings more particularly by reference character, reference numeral 10 refers to a purple martin birdhouse in accordance with the present invention. Birdhouse 10, best seen in FIGS. 1–2, as more particularly described below, mounts on a non-rotatable telescoping pole 12 (FIGS. 14–15) so that the compass direction of the birdhouse does not change when the birdhouse is lowered for nest checking or when it is reinstalled at the beginning of a season. For this, birdhouse 10 must be mountable on pole 12 in just one orientation and the birdhouse and the sections making up the telescoping pole must be non-rotatable with respect to each other.

Figure 2:
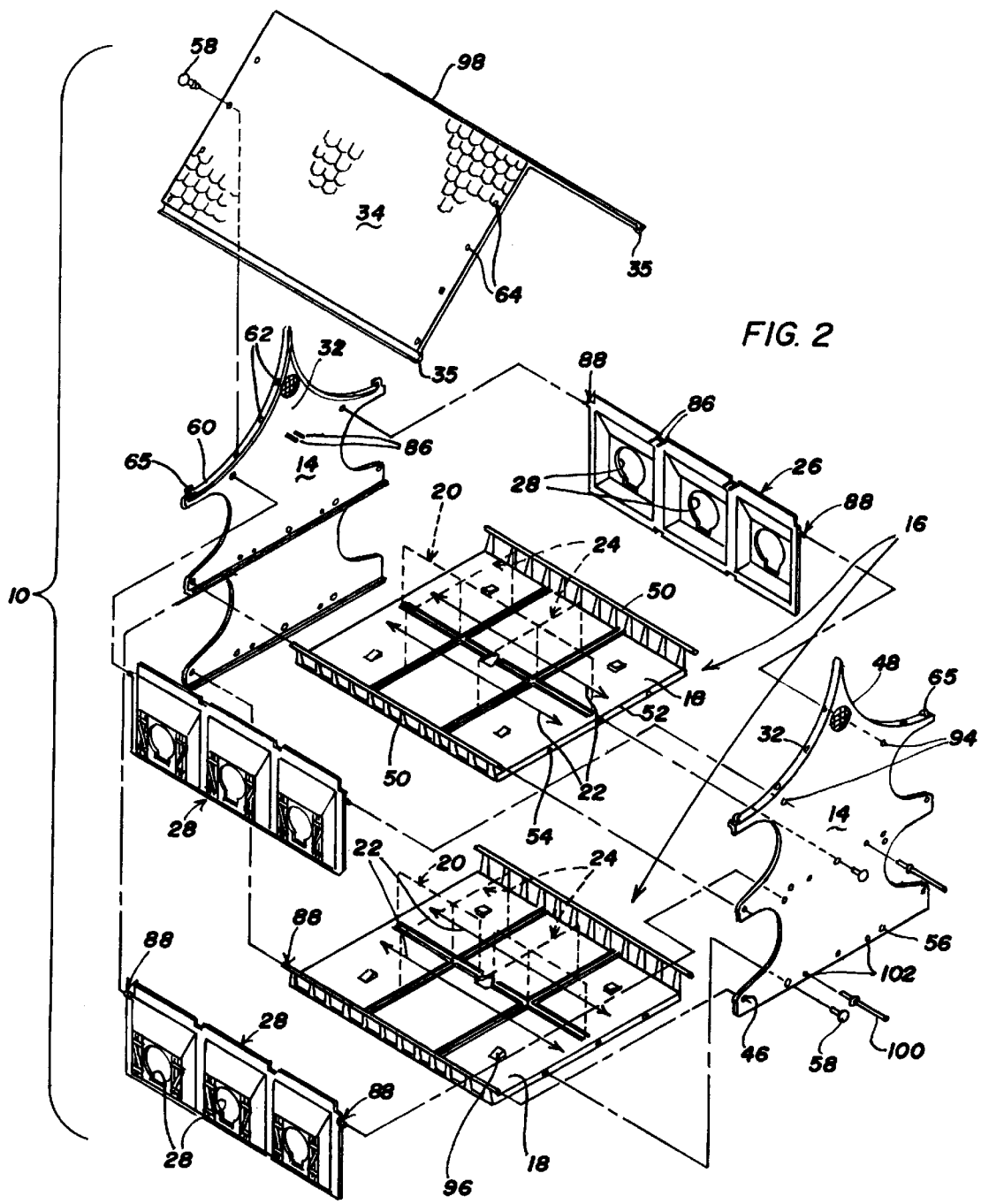
FIG. 2 is an exploded view of the purple martin birdhouse shown in FIG. 1.

As illustrated in the drawings, with continuing reference to FIGS. 1–2, birdhouse 10 has a pair of spaced parallel sidewall panels 14 and two stacked tiers 16, each tier 16 having a floor 18 attached to the sidewall panels. The floor of upper tier 16 serves a dual purpose in that it also defines the ceiling of the lower tier. A first partition 20 is provided for dividing each tier 16 into a row of compartments 22 arranged back to back. Other partitions 24, shown orthogonal to the first, are provided for dividing each row of compartments 22 into individual units. Cleanout doors 26 are pivotally attached to sidewall panels 14 and have openings 28 to provide separate access to the interior of the units in each row of compartments 22. Floor 18 extends beyond each row of compartments 22 to provide a porch or balcony 30. Each of sidewall panels 14 has an upper gable end 32 upon which is mounted a pair of peaked roof panels 34, the lower edge of which is provided with eaves 35 for directing water away from balcony 30. Floor 18 (FIG. 7) has a centrally located hole 36 of cross-section the shape of a convex polygon about which is formed a receiver 38 with a transverse, open-ended hole 42. Receiver 38 is attached to the underside of floor 18, aligned with hole 36 through which pole 12 passes, and has a bore 44 of cross-section the shape of a convex polygon, matching the shape of hole 36.

Convex polygon may be regular or irregular, straight sided or curvilinear and have three or more sides. It is preferred however, that the cross-section of bore 44 be an equilateral triangle because it makes a stronger connection with non-rotating telescoping pole 12 and provides for substantially longer service life. The cross-section can be square, etc. but the joint has a lower load rating.

Sidewall panels 14, as best seen in FIG. 4, are preferably scalloped such that they provide a side railing 46 along each balcony 30 and a support for roof panels 34 overhanging the balcony on upper tier 16. A screened hole 48 shown in FIGS. 2, 4 and 6 may be provided in the gable end of sidewall panels 14 for ventilation. Floor 18 has an upstanding portion at its free margin forming a front railing 50 (FIGS. 1–3 and 7–9) completing the enclosure of balcony 30. Railings 46, 50 prevent young birds from inadvertently falling from the balcony and also serve as a perch for mature birds.

Figure 9:
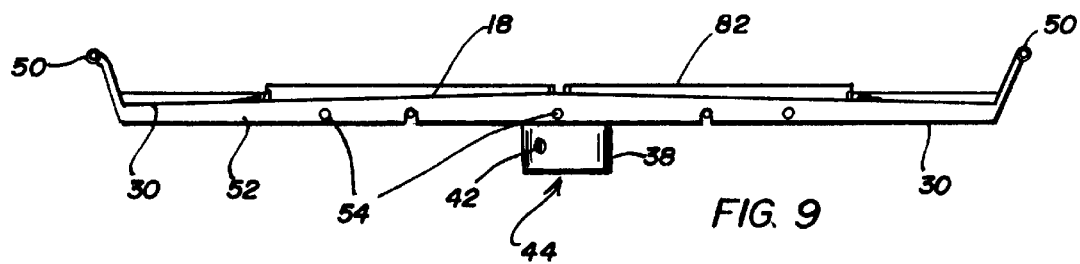
FIG. 9 is a side elevation of the floor.

As best seen in FIG. 9, floor 18 is peaked between sidewall panels 14 and slopes slightly downward towards front railing 50 such that water on balcony 30 is directed away from row of compartments 22 and any water forced under cleanout doors 26 will tend to seep out, keeping the compartments and any nesting material dry. Each of floors 18 has upstanding side flanges 52 with a plurality of holes 54 aligned with similarly spaced holes 56 in sidewall panels 14 by means of which the floors are joined to the sidewall panels with barbed fasteners 58 as shown in FIG. 2. With continuing reference to FIG. 2, sidewall panels 14 have a flange 60 at the top edge with a plurality of holes 62 aligned with similarly spaced holes 64 in roof panels 34 for use in attaching the roof panels to the side walls with barbed fasteners 58. A hook 65 is provided on opposite ends of flange 60 for attachment of roof panels 34 by means of holes provided for that purpose. Hooks 65 stabilize roof panels 34 as barbed fasteners 58 attach the roof to the sidewall panels during assembly of birdhouse 10. Lower floor 18 is seated on a flange 66 provided at the bottom edge of sidewall panels 14, while the upper is seated on a flange 68 midway between the bottom floor and the roof.

The primary difference between upper and lower tiers 16 lies in the construction of first partition 20 and the manner in which the upper edge of partitions 20 and 24 are stabilized. In upper tier 16, the reception space for pole 12 is blocked by partition 20 and the top of the pole is flush with the top of floor 16. As shown in FIG. 13A, first partition 20 is formed by a long divider 70, while other partitions 24 are formed by a pair of shorter dividers 72. Dividers 70, 72 are joined in what is commonly termed "egg-crate" fashion. The "egg-crate" connection is illustrated in FIG. 13A where long divider 70 is provided with a pair of slots 74 in the lower edge thereof. Each of shorter dividers 72 is provided with a similar slot 76 in the upper edge. As shown in FIG. 13B, partitions 20, 24 are formed when dividers 70, 72 are interlocked, with their respective slotted portions engaged to define the inner wall structure. Since pole 12 passes through floor 18 in the lower tier 16, first partition 20 must provide a reception space for the pole. This is accomplished as shown in FIG. 13B where partition 20 is formed by two dividers 78, each of which has a slot 80 in its lower edge for "egg-crate" connection with shorter dividers 72 like those used on upper tier 16. As shown in FIGS. 13A and 13B, dividers 70, 72 and 78 are preferably corrugated for sound and thermal insulation.

Figure 8:
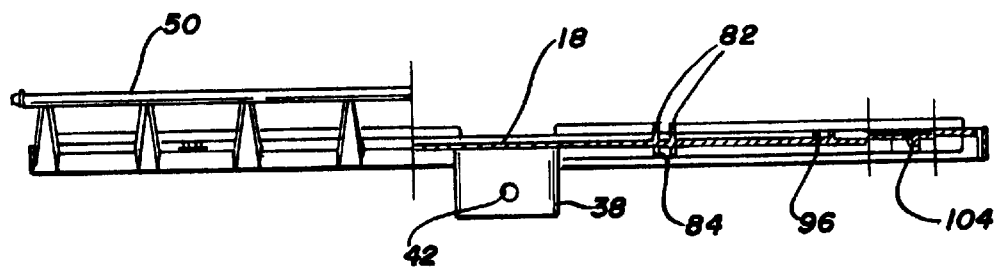
FIG. 8 is a front view of the floor, partly in section, taken along line 8—8 in FIG. 7.

Floors 18 have upwardly and downwardly extending spaced support members 82, forming a grove 84, as shown in FIG. 8. Dividers 70, 72 and 78 are seated in grooves 84. Since floor 18 is sloped downwardly towards front railing 50 as shown in FIG. 9, the depth of groove 84 for dividers 72 is tapered on the upper side of the floor so that the top edge of dividers 72 is level with the top edge of dividers 70 or 78.

The top edge of dividers 72 and 78 of bottom tier 16 are received in groove 84 formed by support members 82 on the lower side of the floor belonging to upper tier 16. Since roof panels 34 form a cathedral ceiling above upper tier 26 and provide no support for the top edge of dividers 70 and 72, a pair of spaced detents 86 are provided on cleanout doors 26 and sidewall panels 14 for stabilizing them (FIGS. 2 and 5–6).

Figure 7:
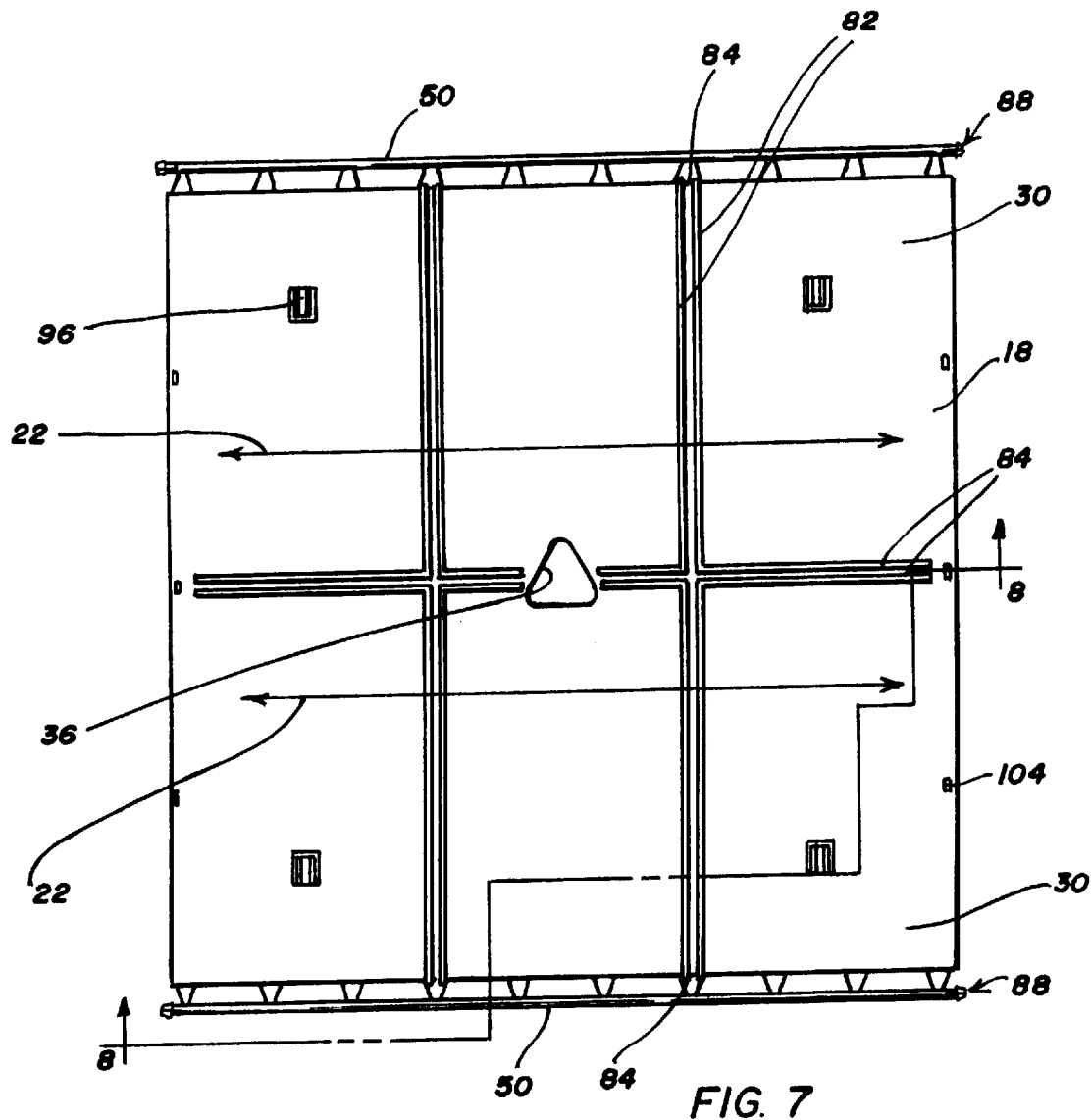
FIG. 7 is a plan view of a floor of one of the stacked tiers.

Cleanout doors 26 are hinged along their upper edge to sidewall panels 14 in any suitable manner, but are preferably attached as illustrated in FIG. 11. Hinges 88 comprises a pair of spaced apart fingers 90 with a tapered protuberance 92 at their free end. As protuberance 92 is forced through a hole 94, fingers 90 are squeezed together. Fingers 90 spring back into their original spaced position when protuberance 92 passes through hole 94, remaining as an anchor preventing the withdrawal of fingers 90 from hole 94. Cleanout doors 26 are thus journaled on fingers 90. Hinges 88 are also used to connect the ends of railing 50 to sidewall panels 14 (FIGS. 2 and 7).

As best seen in FIGS. 2 and 5, cleanout doors 26 are preferably puckered so that they may be made of a thin sheet of material but still be satisfactorily rigid. A latch 96 is provided for releasably engaging cleanout doors 26 when they are in closed position. The latch may take the form of an inclined stop as shown in FIGS. 2 and 7.

Figure 10:
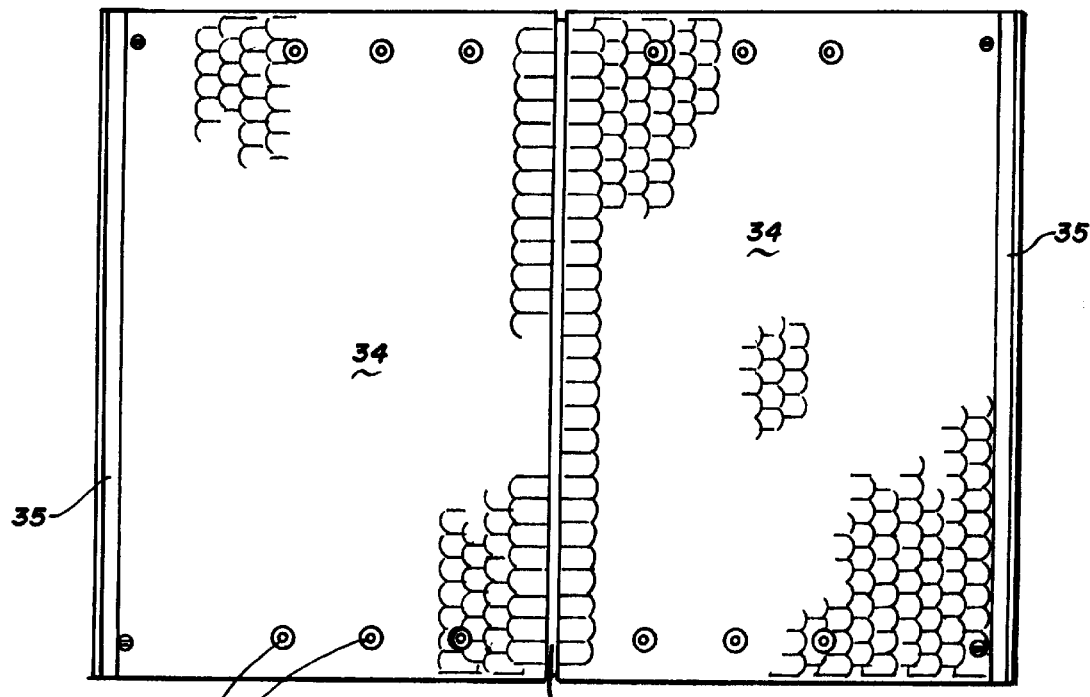
FIG. 10 is a plan view of a pair of roof panels, hinged together at the peak of the roof.

Birdhouse 10 may be formed of various materials but is preferably formed of plastic. As will be readily appreciated, for manufacturing efficiency, floor 18, receiver 38, support members 82, front railing 50 and other associated parts are preferably molded as a unit. Roof panels 34 are also molded together with an integral hinge 98 forming the peak of the roof (FIG. 10). Sidewall panels 14 are similar but of opposite hand and all of cleanout doors 26 are identical. Assembly of birdhouse 10 is easy and can be accomplished in minutes.

Figure 3:
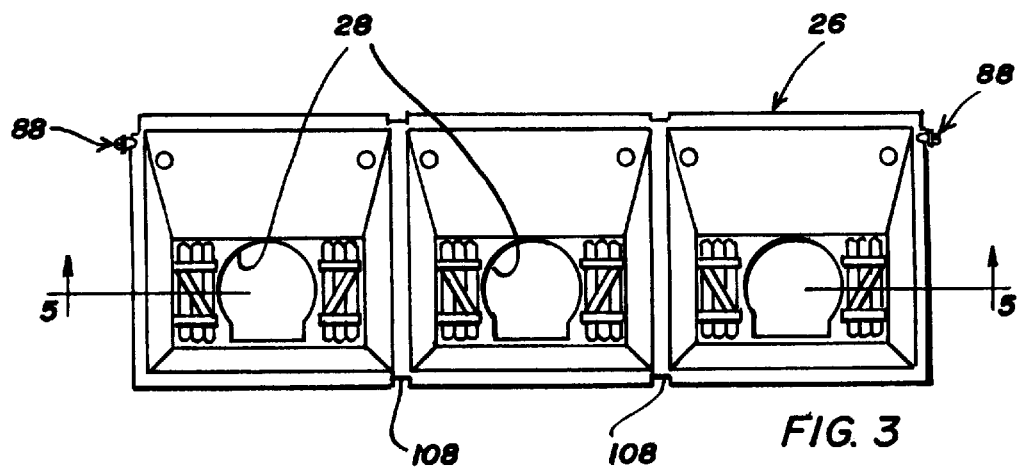
FIG. 3 is a front elevation of a cleanout door for a row of compartments.

Accessories such as perches 100 for attachment to sidewall panels 14 may be provided as shown in FIGS. 12 and 12A. Perches 100 are received in holes 102 molded in sidewall panels 14 for that purpose, as shown in FIG. 2, and are received in a catch 104 provided on the underside of floors 18, shown in FIGS. 7 and 8. Other accessories include dividers 106 shown on the lower tier in FIG. 1 for partitioning balcony 30, making it less likely that a dominant pair of birds will block the entry of other pairs and occupy an entire row of compartments 22. Dividers 106 are received in support members 82 that extend to front railing 50 and slots 108, best seen in FIG. 3, are provided in the bottom of cleanout doors 26 so that support members 82 do not interfere with the opening of the doors.

Turning now to FIGS. 14–15, non-rotating telescoping pole 12 is formed of a plurality of tubular sections 110, preferably made of aircraft aluminum. In the form illustrated, which is the preferred embodiment, pole 12 has three sections 110U, 110M and 110L, each of which is 6 feet long. In fully extended condition, the sections overlap 6 inches and the end of lower section 110L is footed 18 inches deep in a fixative, such as cement 112 as shown in FIG. 17. As such, telescoping pole 12 provides a support for birdhouse 10, positioning it about 15 feet above the ground. The inside of lower section 110L is filled with pea gravel 114 or the like such that middle section 110M does not fully retract inside lower section 110L making it difficult to pull out. While three sections are preferred, it will be understood that telescoping pole 12 may be made with only two sections or with more than three sections.

Upper section 110U has first and second ends 116, 118, respectively, and an outer surface 120 with a cross-section of shape corresponding to the cross-section of receiver 38, i.e., a convex polygon. Second end 118 of upper section 110U has at least one and preferably two vertically aligned holes 122. A pin 124 is aligned with each of holes 122 and is biased outwardly through the hole with a biasing element such as a spring clip 126, seen in FIG. 15. When birdhouse 10 is installed on upper section 110U, pole 12 passes through receivers 38 until the top of the pole is flush with the top of the floor in top tier 16, at which time pins 124 are biased through holes 42 provided in receivers 38, locking the birdhouse to the pole. While the end of upper section 110U could be received in receivers 38 in three different orientations, pins 124 assure that it will be installed in the same orientation each time that it is reinstalled. This guarantees that when birdhouse 10 is taken down at the end of the season that it will be reinstalled on pole 12 in the same polarization or compass direction next year. Relative movement of second end 118 in receiver 38 is prevented by contact of outer surface 120 with bore 44, correct polarization, however, requires pins 124.

First end 116 of upper section 110U is received in middle tubular section 110M. Upper section 110U has a hole 128 proximate its first end and middle tubular section 110M has first and second ends 130, 132, respectively and holes 134, 136 proximate the first and second ends. A pin 138 is biased through hole 128 in first end 116 of upper section 110U with spring clip 126 or the like. When upper section 110U is withdrawn from middle section 110M, leaving a small overlap between the sections, pin is biased through hole 136 in second end 132 of middle section 110M, locking the two sections together. Relative movement of first end 116 of upper section 110U in second end 132 of middle section is prevented by the triangular shape of the tubular sections.

In similar manner first end 130 of middle section 110M is received in lower tubular section 110L. Lower tubular section 110L has first and second ends 140, 142, respectively, first end of which is seated in fixative 112 as described above. A hole 143 is provided proximate second end 142. A pin 144 is biased through the hole in the first end of middle section 110M with spring clip 126. When middle section 110M is withdrawn from lower section 110L, with about 6 inches of overlap between the sections, the two sections are locked together, stopping relative axial movement of the sections. Relative rotation of middle section 110M in lower section 110L is prevented by the triangular shape of the tubular sections.

Figure 18:
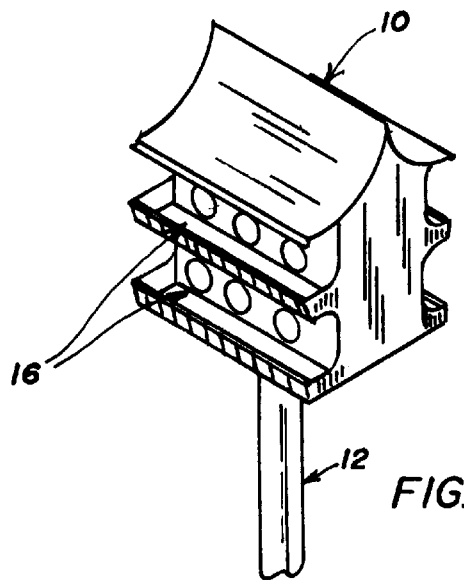
FIG. 18 is a perspective view on a reduced scale showing the birdhouse shown in FIG. 1 on the pole shown in FIGS. 14–15.
Figure 19:
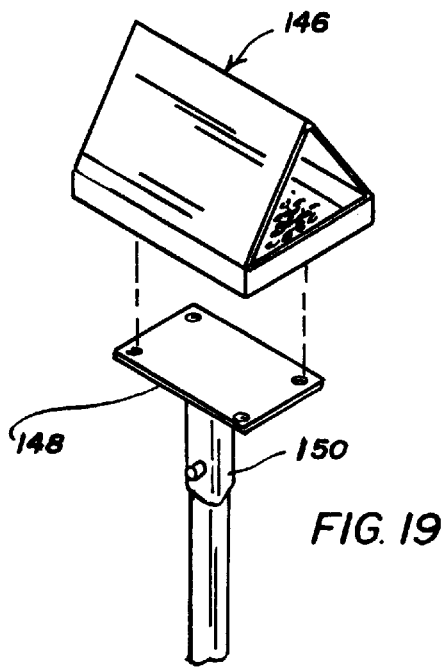
FIG. 19 is an exploded perspective view of a feeder mounted on the pole shown in FIGS. 14–15.
Figure 21:
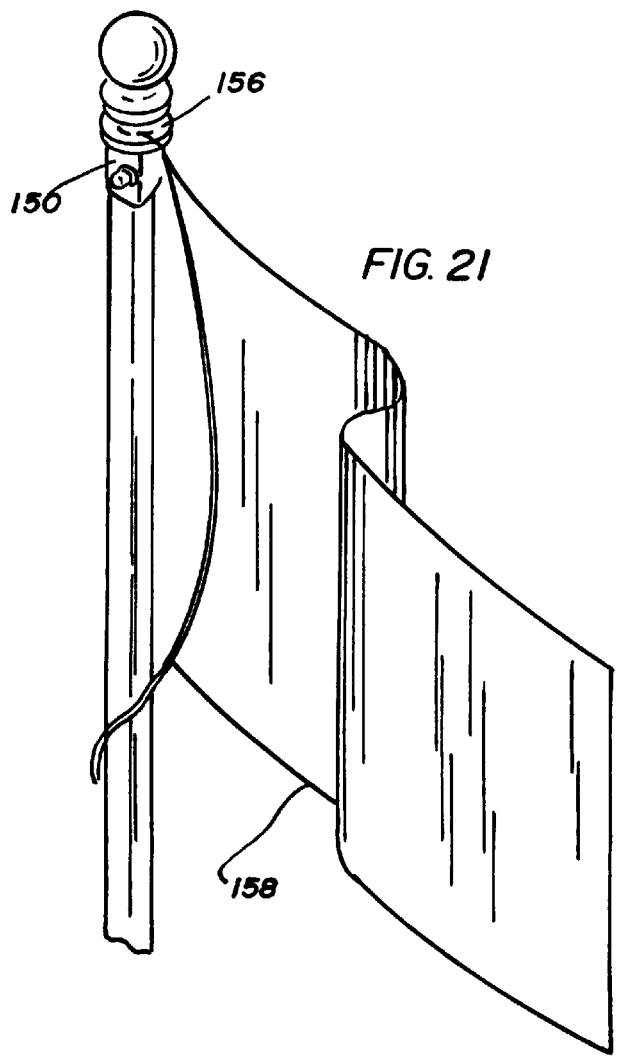
Figure 20:
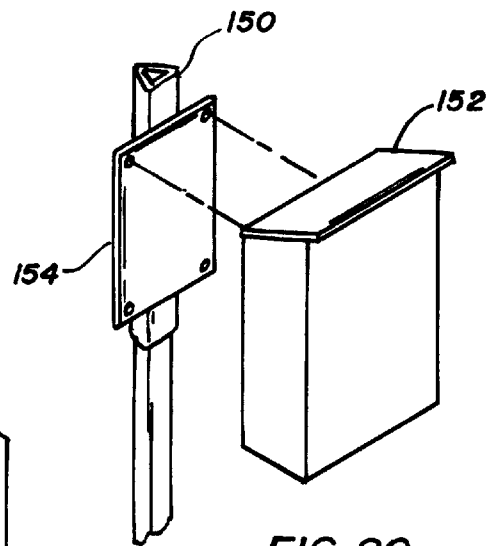
FIG. 20 is an exploded perspective view of a bat house mounted on the pole shown in FIGS. 14–15.

While non-rotating telescoping pole 12 is specially adapted for use with birdhouse 10 as shown in FIG. 18, it may be used for other purposes, illustrative ones of which are shown in FIGS. 19–22. A feeder 146, shown in FIG. 19, may be mounted on a horizontal plate 148 attached to a receiver 150 having a bore with a cross-section shape the same as the bore of receiver 38 on birdhouse 10. In corresponding manner, a bat house 152, illustrated in FIG. 20, is mounted on a vertical plate 154 and can be attached with receiver 150, as can an adapter 156 as shown in FIG. 21 with a swivel for attachment of a flag 158. Other adapters 160, such as shown in FIG. 22, may be provided for mounting a device, such as an ordinary purple martin birdhouse with a circular receiver to pole 12. Non-rotating telescoping pole will prevent accidental rotation of an ordinary house during nest checks, rotation of the house when it removed for winter will not be prevented, however, unless the top of the pole and the house are marked, and the meaning of the markings remembered when the house is put back out in the spring. Other possible devices that can be mounted on pole 12 include a support for gourds and so forth. Hence it is seen that non-rotating telescoping pole 12 can be utilized year-round for different purposes, separate and apart from its intended use with the birdhouse of the present invention.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A purple martin birdhouse comprising a pair of spaced parallel sidewall panels and an upper and a lower tier, said tiers stacked, each tier having a floor attached to the sidewall panels, partitions for dividing each tier into a plurality of compartments in two rows of compartments arranged back to back, cleanout doors pivotally attached to the sidewall panels and having openings to provide separate access to the interior of the individual compartments in each row of compartments, each of said sidewalls having an upper edge upon which is mounted a roof, each of said floors extending beyond each row of compartments to provide a balcony and each of said floors peaked between the sidewalls and sloped towards the balcony whereby water on the balcony drains away from the compartments and any water forced into the compartments tends to seep out, keeping the compartments dry.

2. The birdhouse of claim 1 wherein each of the sidewalls has an upper gable end and said roof comprises a pair of peaked panels, said panels mounted on the gable ends.

3. The birdhouse of claim 2 wherein the roof panels overhang the upper tier and have eaves that direct water away from the balcony.

4. A purple martin birdhouse that can be raised and lowered for nest checks and taken down and reinstalled on a pole with consistent polarization, said birdhouse mounted on a receiver with a bore of cross-section the shape of a convex polygon, said bore having a hole for receipt of a pin whereby when the birdhouse is mounted on a pole having an outer surface with a cross-section of shape corresponding to the cross-section of the receiver and a pin is biased for receipt in the hole of the receiver, the birdhouse can be attached to the pole in just one orientation and relative rotation of the receiver and the pole is prevented by engagement of the outer surface of the pole with the bore of the receiver.

5. The birdhouse of claim 4 wherein the cross-section shape is an equilateral triangle.

6. A purple martin birdhouse comprising a pair of spaced parallel sidewall panels and an upper and a lower tier, said tiers stacked, each tier having a floor attached to the sidewall panels, partitions for dividing each tier into a plurality of compartments in two rows of compartments arranged back to back, cleanout doors pivotally attached to the sidewall panels and having openings to provide separate access to the interior of the individual compartments in each row of compartments, each of said sidewalls having an upper gable upon which is mounted a pair of peaked roof panels, each of said floors extending beyond each row of compartments to provide a balcony, each of said floors peaked between the sidewalls and sloped towards the balcony whereby water on the balcony drains away from the compartments and any water forced into the compartments tends to seep out, keeping the compartments dry, said birdhouse mounted on a receiver with a bore of cross-section the shape of a convex polygon, said bore having a hole for receipt of a pin whereby when the birdhouse is mounted on a pole having an outer surface with a cross-section of shape corresponding to the cross-section of the receiver and a pin biased for receipt in the hole in the receiver, the birdhouse can be attached to the pole in just one orientation and relative rotation of the receiver and the pole is prevented by engagement of the outer surface of the pole with the bore of the receiver.

7. The birdhouse of claim 6 wherein the cross-section shape is an equilateral triangle.

8. The birdhouse of claim 7 wherein the roof panels overhang the upper tier and said roof panels have eaves that direct water away from the balcony.

9. The birdhouse of claim 7 wherein a railing surrounds the balcony to prevent young birds from falling off the balcony and wherein the partitions are formed of corrugated material for sound and thermal insulation.

\* \* \* \* \*